(12) United States Patent
Namboodiri et al.

(10) Patent No.: US 12,507,262 B2
(45) Date of Patent: Dec. 23, 2025

(54) ELECTRONIC DEVICE AND METHOD FOR ENABLING VIRTUAL BSS AND MULTI-AP TRANSMISSIONS

(71) Applicant: Samsung Electronics Co., Ltd., Gyeonggi-do (KR)

(72) Inventors: Vamadevan Namboodiri, San Jose, CA (US); Wook Bong Lee, San Jose, CA (US); Srinivas Kandala, Morgan Hill, CA (US); Ruchen Duan, Santa Clara, CA (US)

(73) Assignee: Samsung Electronics Co., Ltd. (KR)

( * ) Notice: Subject to any disclaimer, the term of this patent is extended or adjusted under 35 U.S.C. 154(b) by 384 days.

(21) Appl. No.: 18/331,685

(22) Filed: Jun. 8, 2023

(65) Prior Publication Data

US 2024/0008057 A1    Jan. 4, 2024

Related U.S. Application Data

(60) Provisional application No. 63/357,701, filed on Jul. 1, 2022.

(51) Int. Cl.
*H04W 72/27* (2023.01)
*H04W 48/16* (2009.01)
*H04W 84/12* (2009.01)
*H04W 88/08* (2009.01)

(52) U.S. Cl.
CPC .......... *H04W 72/27* (2023.01); *H04W 48/16* (2013.01); *H04W 84/12* (2013.01); *H04W 88/08* (2013.01)

(58) Field of Classification Search
CPC ..... H04W 72/27; H04W 48/16; H04W 84/12; H04W 88/08; H04W 24/02; H04W 28/16
See application file for complete search history.

(56) References Cited

U.S. PATENT DOCUMENTS

| | | |
|---|---|---|
| 7,330,472 B2 | 2/2008 | Kowalski |
| 8,472,416 B2 | 6/2013 | Kowalski |
| 9,628,999 B2 | 4/2017 | Aboul-Magd et al. |
| 10,051,588 B2 | 8/2018 | Wang et al. |
| 10,362,494 B2 | 7/2019 | Aboul-Magd et al. |
| 11,159,960 B1 | 10/2021 | Barton et al. |
| 11,197,272 B2 | 12/2021 | Monajemi et al. |
| 11,564,109 B2 | 1/2023 | Chen et al. |

(Continued)

OTHER PUBLICATIONS

Vermani, Sameer et al., "Terminology for AP Coordination", doc.: IEEE 802.11-18/1926r2, Nov. 14, 2018, 10 pages.

(Continued)

*Primary Examiner* — Diane D Mizrahi
(74) *Attorney, Agent, or Firm* — The Farrell Law Firm, P.C.

(57) ABSTRACT

A system and a method are disclosed for controlling a coordinating network entity in a virtual network including a plurality of access points (APs) and at least one wireless station (STA), including receiving one or more parameters from at least one AP included in the plurality of APs; identifying a first multi-AP coordination scheme based on the one or more parameters; and assigning the first multi-AP coordination scheme to a first dynamic group of network entities included in the virtual network, wherein the first dynamic group of network entities performs wireless communication based on the first multi-AP coordination scheme.

20 Claims, 7 Drawing Sheets

(56) References Cited

U.S. PATENT DOCUMENTS

| | | |
|---|---|---|
| 11,659,448 B2 | 5/2023 | Huang et al. |
| 11,659,581 B2 | 5/2023 | Wang et al. |
| 2022/0077993 A1* | 3/2022 | Hong .................. H04W 72/20 |

OTHER PUBLICATIONS

Guo, Jason Yuchen et al., "AP Coordination in EHT", doc.: IEEE 802.11-19/0801r0, Mar. 11, 2019, 12 pages.

Lee, Wook Bong et al., "Virtual BSS for Multi AP Coordination" doc.: IEEE 802.11-19/1019r0, Jul. 2019, 12 pages.

Naribole, Sharan et al., "Virtual BSS for Multi-AP Coordination Follow-up", doc.: IEEE 802.11-19/1451r1, Sep. 15, 2019, 14 pages.

Huang, Guog ang et al., "Operation of Virtual BSS for Multi-AP Coordination", doc.: IEEE 802.11-19/1972r1, Nov. 5, 2019, 7 pages.

Yang, Dan et al., "Multi-AP Group Establishment", doc.: IEEE 802.11-19/1961r0, Nov. 10, 2019, 9 pages.

Park, Sungjin et al., "Multi-AP Transmission Procedure", doc.: IEEE 802.11-19/0804r0, May 13, 2019, 14 pages.

\* cited by examiner

ELECTRONIC DEVICE AND METHOD FOR ENABLING VIRTUAL BSS AND MULTI-AP TRANSMISSIONS

CROSS-REFERENCE TO RELATED APPLICATION

This application claims the priority benefit under 35 U.S.C. § 119(e) of U.S. Provisional Application No. 63/357,701, filed on Jul. 1, 2022, the disclosure of which is incorporated by reference in its entirety as if fully set forth herein.

TECHNICAL FIELD

The disclosure generally relates to multi access point (AP) protocols. More particularly, the subject matter disclosed herein relates to improvements to collection and management of APs in a wireless communication system.

SUMMARY

In the Institute of Electrical and Electronics Engineers (IEEE) 802.11 study group, ultra high reliability (UHR) has been established to develop a project authorization request (PAR) for an 802.11 amendment. Some of the goals of this amendment are to enhance the reliability of wireless local area network (WLAN) connectivity, decrease latencies, increase manageability, increase throughput including at different signal to noise (SNR) levels, and reduce device-level power consumption.

One approach to address several of these objectives is the use of multi-AP coordination schemes. These schemes include joint transmission, coordinated orthogonal frequency division multiple access (OFDMA), coordinated spatial reuse, and coordinated beamforming. Joint transmission may allow for multiple APs to simultaneously transmit to a given station (STA), while coordinated OFDMA extends the 11-ax OFDMA concept from a single basic service set (BSS) to multi-BSS scenarios. Coordinated spatial reuse (C-SR) may extend the 11-ax spatial reuse in a coordinated fashion, and coordinated beamforming may enable an AP to transmit signals to an STA in its own BSS while forming signal nulls to STAs from adjoining/interfering BSSs. This approach can be used together with C-SR. These multi-AP coordination schemes have shown the potential to improve reliability, reduce latency, and increase throughput.

To further improve WLAN connectivity, systems and methods are described herein for collection and management of parameters of APs and STAs, specifically related to coordinated, joint transmission and roaming features using a virtual BSS (V-BSS) concept to maximize area throughput, reliability and connectivity, or to improve upon any other WLAN connectivity interest (such as minimizing a packet delay).

In addition, systems and methods are described herein for generating a network map to optimize multi-AP operations.

In an embodiment, a method performed by a coordinating network entity in a virtual network including a plurality of APs and at least one wireless STA comprises receiving one or more parameters from at least one AP included in the plurality of APs; identifying a first multi-AP coordination scheme based on the one or more parameters; and assigning the first multi-AP coordination scheme to a first dynamic group of network entities included in the virtual network, wherein the first dynamic group of network entities performs wireless communication based on the first multi-AP coordination scheme.

In an embodiment, a virtual network comprises a plurality of APs; at least one wireless STA; and a coordinating network entity configured to receive one or more parameters from at least one AP included in the plurality of APs; identify a first multi-AP coordination scheme based on the one or more parameters; and assign the first multi-AP coordination scheme to a first dynamic group of network entities included in the virtual network, wherein the first dynamic group of network entities performs wireless communication based on the first multi-AP coordination scheme.

BRIEF DESCRIPTION OF THE DRAWING

In the following section, the aspects of the subject matter disclosed herein will be described with reference to exemplary embodiments illustrated in the figures, in which.

DETAILED DESCRIPTION

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail to not obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not necessarily all be referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-a-chip (SoC), an assembly, and so forth.

Figure 1:
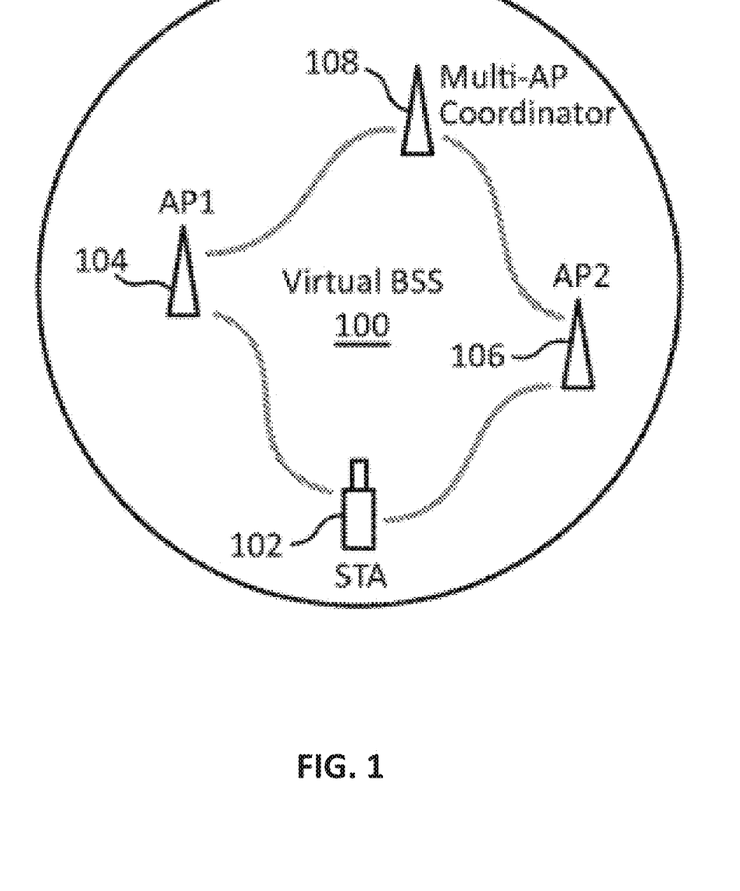
FIG. 1 illustrates a V-BSS network configuration, according to an embodiment.

FIG. 1 illustrates a V-BSS network configuration, according to an embodiment.

Referring to FIG. 1, a V-BSS network (e.g., a "virtual network") configuration includes a multi-AP coordinator (e.g., a "coordinator-AP" (C-AP) or "coordinating network entity") 108, a first AP 104 (e.g., a first "anchor AP"), and a second AP 106 (e.g., a second "anchor AP"). The first anchor AP 104 and the second anchor AP 106 may have the same service set identifier (SSID) and/or BSSID and share an association and/or authentication with an STA 102 to enable roaming within the V-BSS 100 without reassociation and/or reauthentication. The multi-AP coordinator 108 may be a separate component or integrated with the first anchor AP 104 or the second anchor AP 106.

The STA 102 may select to communicate with an anchor AP based on link quality metrics, such as a received signal strength indicator (RSSI), and maintain a local copy of an anchor AP's capabilities and those of neighboring anchor APs. The STA 102 may obtain link quality metrics from measurements or information received from anchor APs. Anchor APs may also send anchor AP side link quality metrics to the STA 102.

An anchor AP may relay transmissions between the STA 102 and the multi-AP coordinator 108. The STA's 102 association and/or authentication with at least one anchor AP may be shared with some or all anchor APs, allowing the STA to use any subsequently selected anchor AP to relay transmissions without reauthentication. Additionally or alternatively, the multi-AP coordinator 108 may select the anchor AP for the STA 102 based on link quality metrics, or a combination of STA-driven and coordinator-controlled AP selection may be implemented. For example, the STA 102 may select an anchor AP for uplink (UL) transmissions, and the multi-AP coordinator 108 may determine a second anchor AP for downlink (DL) transmissions.

Figure 2:
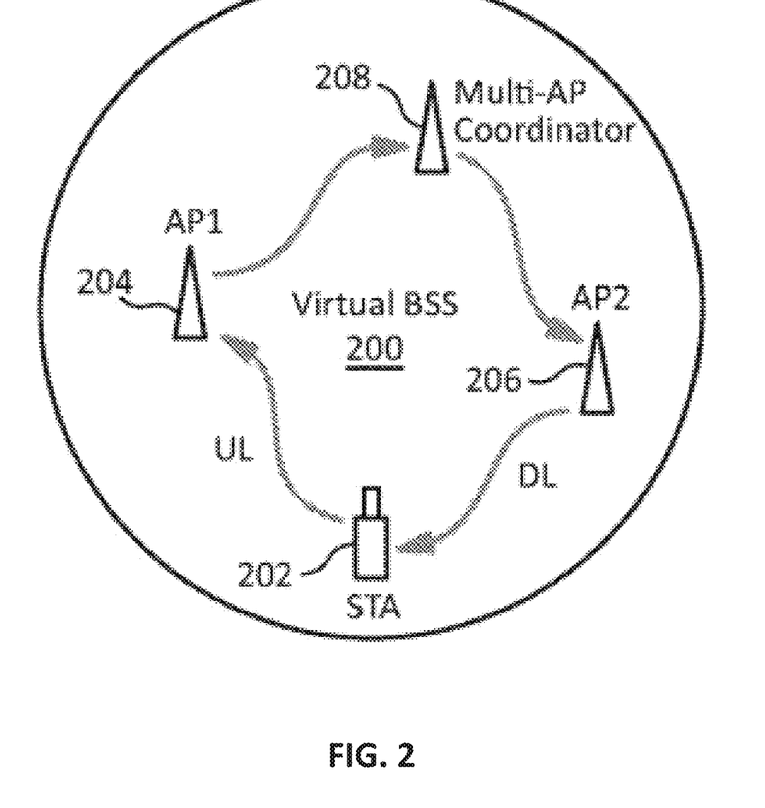
FIG. 2 illustrates a V-BSS network configuration, according to an embodiment.

FIG. 2 illustrates a V-BSS network configuration, according to an embodiment.

Referring to FIG. 2, within the V-BSS 200, UL traffic may flow from an STA 202, to a multi-AP coordinator 208, via a first anchor AP 204. DL traffic may flow from the multi-AP coordinator 208, to the STA 202, via a second anchor AP 206.

Figure 3:
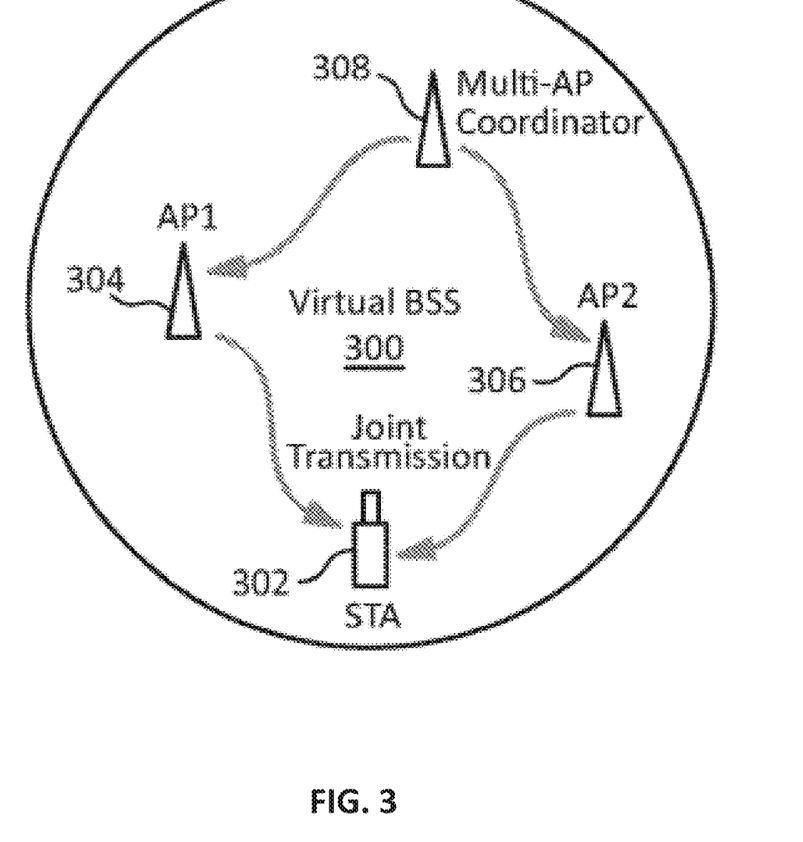
FIG. 3 illustrates a V-BSS network configuration, according to an embodiment.

FIG. 3 illustrates a V-BSS network configuration, according to an embodiment.

Referring to FIG. 3, DL traffic within the V-BSS 300 may flow from a multi-AP coordinator 302 to an STA 308 via both a first anchor AP 304 and a second anchor AP 306. Joint transmission may use the same or different time and frequency resources, such as time division multiplexing (TDM) and/or frequency division multiplexing (FDM).

An STA-driven AP selection scheme may be used with multiple anchor APs, where the STA informs the multi-AP coordinator of the anchor APs using a management frame. Alternatively, a coordinator-controlled AP selection scheme may be used where the coordinator chooses anchor APs for an STA for DL traffic, while the STA selects an anchor AP for UL transmissions.

If there is more than one route for transmitting wireless signals from the multi-AP coordinator to the STA (e.g., using one or more different nodes or network devices), the multi-AP coordinator may select the path based on link quality metrics in a coordinator-controlled AP selection scheme with a multi-route path. In an STA-driven AP selection scheme, the coordinator may not be able to find the anchor AP of the STA based on the UL data packets, so the STA may inform the multi-AP coordinator of its selected/updated anchor AP to update the routing for DL traffic to the STA.

Access controller functionality may be enhanced by collecting and managing various physical layer (PHY) parameters in a V-BSS-based multi-AP Wi-Fi network. Collecting and managing parameters may help the multi-AP network dynamically configure itself and optimize its performance, functions that may be lacking or underdeveloped in an access controller.

As described herein, a method for collecting necessary parameters from a network, to configure the network for multi-AP transmissions using a V-BSS configuration is provided.

Figure 4:
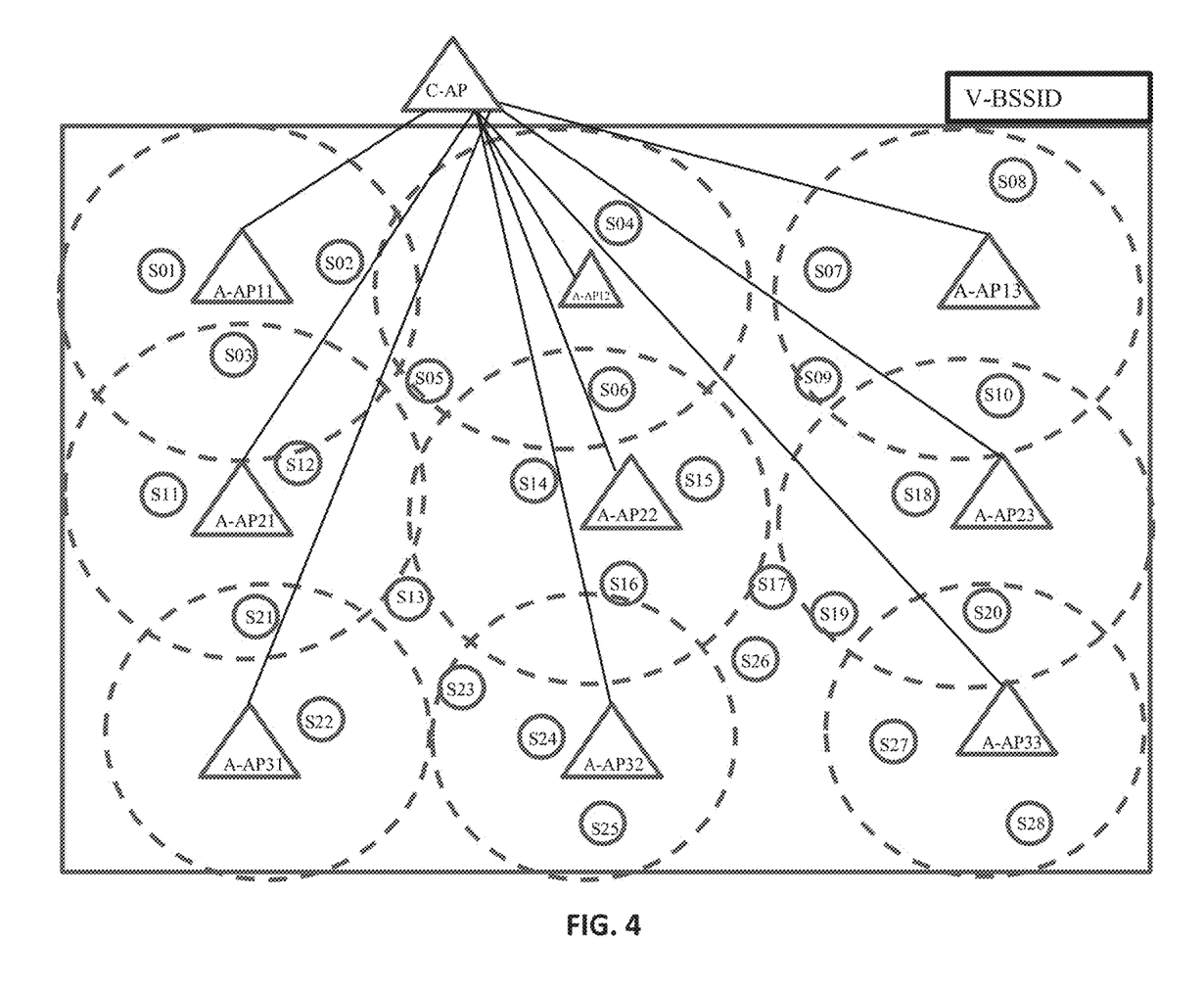
FIG. 4 illustrates a V-BSS network configuration, according to an embodiment.

FIG. 4 illustrates a V-BSS network configuration, according to an embodiment.

The V-BSS wireless network configuration illustrated in FIG. 4 is a more complex V-BSS configuration as compared to those shown in FIGS. 1-3. That is, the V-BSS configuration shown in FIG. 4 includes nine anchor APs, each corresponding to its own wireless communication area. The multi-AP coordinator is illustrated as "C-AP" in FIG. 4 and may communicate with each of the nine anchor APs and provide coordination information for assisting the nine anchor APs to select and apply a wireless communication scheme that is best suited for communicating with wireless STAs that may be positioned in one or more areas corresponding to the nine anchor APs. Notably, the V-BSS wireless network configuration in FIG. 4 advantageously enables the plurality of anchor APs to coordinate among each other so as to maximize the networks throughput, reduce latency, and improve reliability. More or less anchor APs and STAs may be provided in the V-BSS than what is shown in FIG. 4.

Referring to FIG. 4, STA S01, STA S02, STA S03, STA S04, STA S05, STA S06, STA S07, STA S08, STA S09, STA S10, STA S11, STA S12, STA S13, STA S14, STA S15, STA S16, STA S17, STA S18, STA S19, STA S20, STA S21, STA S22, STA S23, STA S24, STA S25, STA S26, STA S27, and STA S28 are wirelessly connected to one or more of anchor AP A-AP11, anchor AP A-AP12, anchor AP A-AP13, anchor AP A-AP21, anchor AP A-AP22, anchor AP A-AP23, anchor AP A-AP31, anchor AP A-AP32, and anchor AP A-AP33, in the V-BSS V-BSSID.

Anchor AP A-AP11, anchor AP A-AP12, anchor AP A-AP13, anchor AP A-AP21, anchor AP A-AP22, anchor AP A-AP23, anchor AP A-AP31, anchor AP A-AP32, and anchor AP A-AP33 each are connected to multi-AP coordinator C-AP. Multi-AP coordinator C-AP includes a control path to each anchor AP, and may have a wired or wireless connectivity. In addition, a link quality metric (LQM) may be measured as a path loss between two entities in the wireless network.

In V-BSS V-BSSID, each of anchor AP A-AP11 to anchor AP A-AP 33 may be fixed to a predetermined location and connected to the multi-AP coordinator C-AP by a wired or wireless back-haul connection. Each of STA S01 to STA S28 may be static or slow moving. Multi-AP coordinator C-AP may or may not be a separate device from one of the anchor APs or STAs, and may be included in one of the anchor APs. In addition, the multi-AP coordinator C-AP may be preconfigured with an A-AP list in the V-BSS. Multiple V-BSSs may be connected together using a backbone network to form an extended service set (ESS) including, for example, a first V-BSS V-BSSID1, a second V-BSS V-BSSID2, and a third V-BSS V-BSSID3. Each of these V-BSSs may coordinate with one another to provide enhanced multi-AP transmission schemes to further improve throughput and reduce latency.

Some or all of the elements of a V-BSS may form one or more dynamic groups. A dynamic group may be a subset of A-APs in a V-BSS that participate in a same or similar multi-AP transmission mode. An A-AP in a V-BSS may belong to one or more different dynamic groups. Each dynamic group may be free to engage in its own multi-AP transmission mode.

For each V-BSS, there may be one C-AP and one or more A-APs, and there may be one or more dynamic groups. Each dynamic group may include one or more A-APs and associated STAs. Each dynamic group may have a same or similar multi-AP transmission mode. C-AP may determine a dynamic group in a V-BSS based on a relative spatial configuration (e.g., a network map) of devices.

As described below, a network map may be generated and used to optimize multi-AP operations.

A network map may include one or more LQM tables and/or queue size metrics (e.g., data in the transmit queues of the device(s)). Two types of LQM tables may be used. A first LQM table may include A-AP to A-AP measurements, and a second LQM table may include A-AP to STA measurements.

The first LQM table may be generated at one or more A-APs at the time an A-AP is powered on by listening to beacons from neighboring A-APs to form a path loss table. The first LQM table may be periodically updated by an A-AP and sent from the A-AP to the multi-AP coordinator C-AP. The multi-AP coordinator C-AP may review and/or modify the first LQM table.

For example, the first LQM table may be generated as follows. Upon boot up, each A-AP may listen to beacons from neighboring A-APs in the V-BSS for a duration of a predetermined amount of time, and create a path-loss table for each A-AP. For example, the path loss table of A-AP11 may be represented as Table 1 below.

TABLE 1

|        | A-AP11        | A-AP12        | ... | A-AP33        |
|--------|---------------|---------------|-----|---------------|
| A-AP11 | PL_AP11_AP11  | PL_AP11_AP12  |     | PL_AP11_AP33  |

In Table 1, "PL_AP11_AP11" is a path loss value from A-AP11 to A-AP11, "PL_AP11_AP12" is a path loss value from A-AP11 to A-AP12, etc.

In addition, each A-AP may periodically update its table after a predetermined amount of time by listening to beacons from neighboring A-APs. Furthermore, each A-AP may transmit updated tables to the multi-AP coordinator C-AP.

The second LQM table may be generated at one or more STAs by listening to beacons from neighboring A-APs to form a path loss table. The second LQM table may be periodically updated by an STA and sent from the STA to the A-AP that the STA is associated with. The A-AP may send the second LQM table to the multi-AP coordinator C-AP. The multi-AP coordinator C-AP may review and/or modify the second LQM table.

A network map may include UL and DL queue size metrics. To determine the UL queue size metrics, STAs may send their UL queue size to an A-AP, which in turn sends it to the multi-AP coordinator C-AP. The multi-AP coordinator C-AP may append the first and/or second LQM table downstream with an UL queue size for each STA. To determine the DL queue size metrics, an A-AP may send the DL queue size of an STA to the multi-AP coordinator C-AP. The multi-AP coordinator C-AP may append the first and/or second LQM table downstream with a DL queue size for each STA. In addition, if an overlapping V-BSS (O(V)BSS) is detected, interference table(s) can also be generated.

To apply the network map including one or more tables and/or queue size metrics, the multi-AP coordinator C-AP may determine the most suitable transmission mode for each dynamic group in a V-BSS. This determination may improve a performance metric, such as maximizing the throughput of the V-BSS. Additionally, a goal may be to increase the throughput uniformly for a predetermined number of STAs or more within the V-BSS coverage area, providing the STAs with a data rate that exceeds a predefined data rate. Furthermore, the multi-AP coordinator C-AP may also seek to minimize latency for a selected group of STAs. An estimate of latency can be obtained by considering the queue size and the LQM (e.g., one or more channel/medium quality metrics). The multi-AP coordination scheme selected by the multi-AP coordinator C-AP may be quasi-static, meaning that they remain unchanged unless (or until) there is a predefined change in the LQM, queue size, or another parameter.

The multi-AP coordinator C-AP may determine the most suitable transmission mode based on a number of different coordination parameters. For example, the multi-AP coordinator C-AP may apply a first suitable transmission mode based on spatial configurations of A-APs in the V-BSS that are determined using an LQM table including A-AP to A-AP measurements (e.g., the first LQM table).

Additionally or alternatively, the multi-AP coordinator C-AP may determine the most suitable transmission mode based on an LQM table including A-AP to STA measurements (e.g., the second LQM table) and/or UL and DL queue size metrics. In this case, the multi-AP coordinator C-AP may map out the most suitable A-APs and multi-AP transmission modes for reaching STAs in the network.

Accordingly, the multi-AP coordinator C-AP may configure the network components included in the V-BSS coverage area to perform coordinated transmissions according to the coordinated transmission protocols proposed for different modes.

The multi-AP coordinator C-AP may apply the network map and use the LQM tables and/or queue size information to determine dynamic groups and assign each dynamic group one or more multi-AP coordination schemes. For example, the following multi-AP coordination schemes may be assigned to one or more dynamic groups by the multi-AP coordinator C-AP: C-SR, coordinated OFDMA, coordinated beamforming, and/or joint transmission. Other multi-AP coordination schemes may be assigned by the multi-AP coordinator C-AP as well.

C-SR is a technique that allows multiple APs to coordinate their spatial reuse patterns to improve the performance of the network in areas with high user density. In some wireless networks, each AP may use the same spatial reuse pattern. This can lead to interference between APs, as they may be transmitting to the same STAs. C-SR allows APs to coordinate their spatial reuse patterns so that they do not interfere with each other. This can improve the performance of the network in areas with high user density.

Coordinated OFDMA can be used to improve the efficiency of the use of the wireless spectrum. In conventional OFDMA, each AP independently schedules its transmissions. This can lead to inefficient use of the spectrum, as some APs may be transmitting in the same frequency bands as other APs. Coordinated OFDMA allows APs to coordinate their transmissions so that they do not interfere with each other. This can improve the efficiency of the use of the spectrum and increase the throughput of the network.

Coordinated beamforming can be used to focus the transmissions of APs to specific STAs. This can improve the performance of the network by reducing the interference from other STAs. Coordinated beamforming can be used in both the UL and DL. In the UL, coordinated beamforming can be used to improve the SNR and reduce the decoding errors. In the DL, coordinated beamforming can be used to increase the throughput and reduce the interference from other STAs.

Joint transmission is a technique that allows multiple APs to share their processing resources to receive data from a single STA. This can improve the performance of the network by reducing the latency and increasing the throughput. Joint transmission can be used to improve the performance of DL transmissions. In the DL, joint transmission can be used to combine the signals from multiple APs before transmitting them to a single STA. This can improve the SNR and reduce the interference from other STAs.

Figure 5:
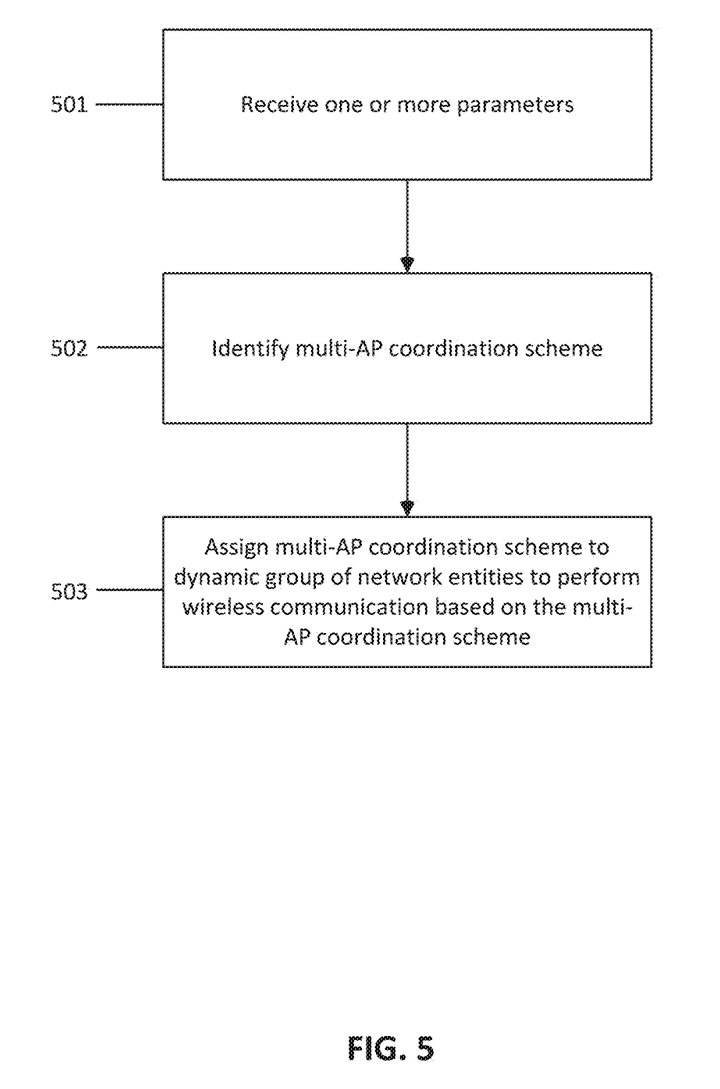
FIG. 5 illustrates a flowchart depicting steps performed by a coordinator-AP operating in a V-BSS, according to an embodiment.

FIG. 5 illustrates a flowchart depicting steps performed by a coordinator-AP operating in a V-BSS, according to an embodiment.

As stated above, a coordinator-AP (e.g., a multi-AP coordinator C-AP as shown in FIG. 4) may be wirelessly connected (or hardwired) to a plurality of anchor-APs in a V-BSS. The coordinator-AP may be used to help form dynamic groups and/or apply a multi-AP communication scheme to one or more of the dynamic groups.

Referring to FIG. 5, the coordinator-AP receives one or more parameters. The one or more parameters may include A-AP to A-AP path loss information, A-AP to STA path loss information, and/or UL and DL queue size for communication between an A-AP and an STA. The parameters may be provided in the form of a table and include a network map detailing a value for each parameter with respect to other network components. Additionally, other PHY parameters may be obtained and provided to the coordinator-AP, such as channel information, channel width information, modulation scheme information, coding scheme information, or transmission or reception power information.

The one or more parameters discussed in step 501 can be received directly from an anchor AP, or can be received from an STA via an anchor AP. For instance, the STA can determine a parameter, pass it on to an anchor AP, which then sends it to the coordinator-AP.

In step 502, a multi-AP coordination scheme is identified by the coordinator-AP. The multi-AP coordination scheme may be identified for a dynamic group. For instance, a first dynamic group may have a first multi-AP coordination scheme and a second dynamic group may have a second multi-AP coordination scheme. The multi-AP coordination schemes may be changed based on the parameters received in step 501. A goal of the multi-AP coordination schemes is to improve efficiency for communication between anchor APs in the V-BSS and STA's they serve. Multi-AP coordination schemes may include, but are not limited to, at least, C-SR, coordinated-OFDMA, coordinated beamforming, and/or joint transmission.

In step 503, one or more multi-AP coordination schemes are assigned to one or more dynamic groups. As mentioned above, each dynamic group may be made up of V-BSS network entities (e.g., one or more anchor APs and/or one or more STAs). Each dynamic group may include the same or different individual network entities. Therefore, in this manner, some network entities may be included in more than one dynamic group and, therefore, may be assigned with more than one multi-AP coordination scheme. Furthermore, as discussed above, the multi-AP coordination scheme may be changed based on various network parameters that are provided through the table(s) in step 501. Since parameters may be provided periodically, the coordinator-AP may reassess the assignment of different multi-AP coordination schemes and adjust them in order to maximize network throughput and reduce latency.

Figure 6:
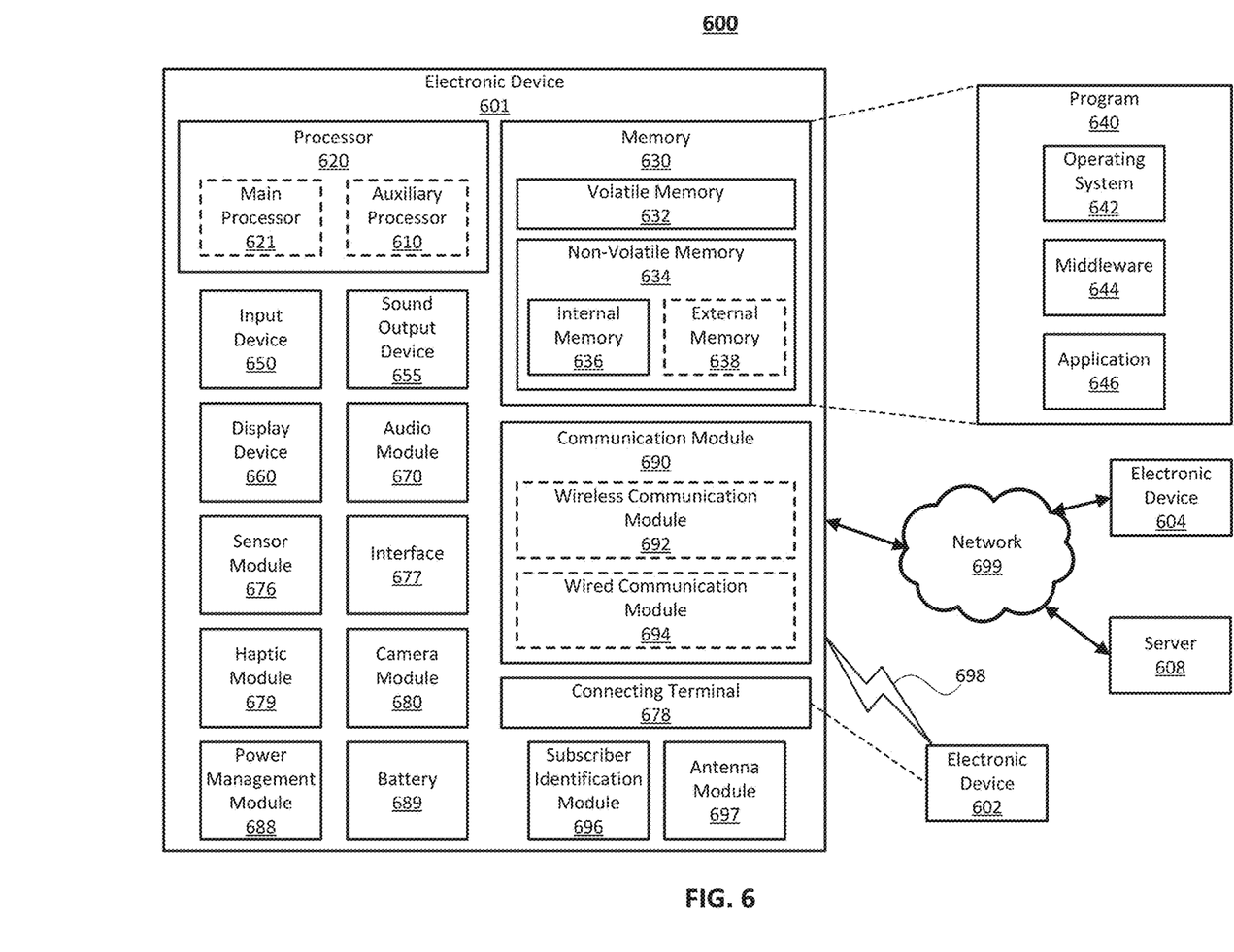
FIG. 6 is a block diagram of an electronic device in a network environment, according to an embodiment.

As discussed below, an electronic device may provide structure capable of performing the functions of the network entities of the V-BSS. That is, an AP and/or an STA may be realized by an electronic device 601, an electronic device 602, electronic device 604, a program 640, or a server 608. Moreover, an anchor-AP, coordinator-AP, and/or STA may be realized by instructions stored in a memory (e.g., a program 640 stored in memory 630) executed by a processor included in one of the electronic device 601, an electronic device 602, electronic device 604, a program 640, or a server 608.

FIG. 6 is a block diagram of an electronic device in a network environment 600, according to an embodiment.

Referring to FIG. 6, an electronic device 601 in a network environment 600 may communicate with an electronic device 602 via a first network 698 (e.g., a short-range wireless communication network), or an electronic device 604 or a server 608 via a second network 699 (e.g., a long-range wireless communication network). The electronic device 601 may communicate with the electronic device 604 via the server 608. The electronic device 601 may include a processor 620, a memory 630, an input device 640, a sound output device 655, a display device 660, an audio module 670, a sensor module 676, an interface 677, a haptic module 679, a camera module 680, a power management module 688, a battery 689, a communication module 690, a subscriber identification module (SIM) card 696, or an antenna module 694. In one embodiment, at least one (e.g., the display device 660 or the camera module 680) of the components may be omitted from the electronic device 601, or one or more other components may be added to the electronic device 601. Some of the components may be implemented as a single integrated circuit (IC). For example, the sensor module 676 (e.g., a fingerprint sensor, an iris sensor, or an illuminance sensor) may be embedded in the display device 660 (e.g., a display).

The processor 620 may execute software (e.g., a program 640) to control at least one other component (e.g., a hardware or a software component) of the electronic device 601 coupled with the processor 620 and may perform various data processing or computations.

As at least part of the data processing or computations, the processor 620 may load a command or data received from another component (e.g., the sensor module 646 or the communication module 690) in volatile memory 632, process the command or the data stored in the volatile memory 632, and store resulting data in non-volatile memory 634. The processor 620 may include a main processor 621 (e.g., a central processing unit (CPU) or an application processor (AP)), and an auxiliary processor 623 (e.g., a graphics processing unit (GPU), an image signal processor (ISP), a sensor hub processor, or a communication processor (CP)) that is operable independently from, or in conjunction with, the main processor 621. Additionally or alternatively, the auxiliary processor 623 may be adapted to consume less power than the main processor 621, or execute a particular function. The auxiliary processor 623 may be implemented as being separate from, or a part of, the main processor 621.

The auxiliary processor 623 may control at least some of the functions or states related to at least one component (e.g., the display device 660, the sensor module 676, or the communication module 690) among the components of the electronic device 601, instead of the main processor 621 while the main processor 621 is in an inactive (e.g., sleep) state, or together with the main processor 621 while the main processor 621 is in an active state (e.g., executing an application). The auxiliary processor 623 (e.g., an image signal processor or a communication processor) may be implemented as part of another component (e.g., the camera module 680 or the communication module 690) functionally related to the auxiliary processor 623.

The memory 630 may store various data used by at least one component (e.g., the processor 620 or the sensor module 676) of the electronic device 601. The various data may include, for example, software (e.g., the program 640) and input data or output data for a command related thereto. The memory 630 may include the volatile memory 632 or the non-volatile memory 634.

The program 640 may be stored in the memory 630 as software, and may include, for example, an operating system (OS) 642, middleware 644, or an application 646.

The input device 650 may receive a command or data to be used by another component (e.g., the processor 620) of the electronic device 601, from the outside (e.g., a user) of the electronic device 601. The input device 650 may include, for example, a microphone, a mouse, or a keyboard.

The sound output device 655 may output sound signals to the outside of the electronic device 601. The sound output device 655 may include, for example, a speaker or a receiver. The speaker may be used for general purposes, such as playing multimedia or recording, and the receiver may be used for receiving an incoming call. The receiver may be implemented as being separate from, or a part of, the speaker.

The display device 660 may visually provide information to the outside (e.g., a user) of the electronic device 601. The display device 660 may include, for example, a display, a hologram device, or a projector and control circuitry to control a corresponding one of the display, hologram device, and projector. The display device 660 may include touch circuitry adapted to detect a touch, or sensor circuitry (e.g., a pressure sensor) adapted to measure the intensity of force incurred by the touch.

The audio module 670 may convert a sound into an electrical signal and vice versa. The audio module 670 may obtain the sound via the input device 650 or output the sound via the sound output device 655 or a headphone of an external electronic device 602 directly (e.g., wired) or wirelessly coupled with the electronic device 601.

The sensor module 676 may detect an operational state (e.g., power or temperature) of the electronic device 601 or an environmental state (e.g., a state of a user) external to the electronic device 601, and then generate an electrical signal or data value corresponding to the detected state. The sensor module 676 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 677 may support one or more specified protocols to be used for the electronic device 601 to be coupled with the external electronic device 602 directly (e.g., wired) or wirelessly. The interface 677 may include, for example, a high-definition multimedia interface (HDMI), a universal serial bus (USB) interface, a secure digital (SD) card interface, or an audio interface.

A connecting terminal 678 may include a connector via which the electronic device 601 may be physically connected with the external electronic device 602. The connecting terminal 678 may include, for example, an HDMI connector, a USB connector, an SD card connector, or an audio connector (e.g., a headphone connector).

The haptic module 679 may convert an electrical signal into a mechanical stimulus (e.g., a vibration or a movement) or an electrical stimulus which may be recognized by a user via tactile sensation or kinesthetic sensation. The haptic module 679 may include, for example, a motor, a piezoelectric element, or an electrical stimulator.

The camera module 680 may capture a still image or moving images. The camera module 680 may include one or more lenses, image sensors, image signal processors, or flashes. The power management module 688 may manage power supplied to the electronic device 601. The power management module 688 may be implemented as at least part of, for example, a power management integrated circuit (PMIC).

The battery 689 may supply power to at least one component of the electronic device 601. The battery 689 may include, for example, a primary cell which is not rechargeable, a secondary cell which is rechargeable, or a fuel cell.

The communication module 690 may support establishing a direct (e.g., wired) communication channel or a wireless communication channel between the electronic device 601 and the external electronic device (e.g., the electronic device 602, the electronic device 604, or the server 608) and performing communication via the established communication channel. The communication module 690 may include one or more communication processors that are operable independently from the processor 620 (e.g., the AP) and supports a direct (e.g., wired) communication or a wireless communication. The communication module 690 may include a wireless communication module 692 (e.g., a cellular communication module, a short-range wireless communication module, or a global navigation satellite system (GNSS) communication module) or a wired communication module 694 (e.g., a local area network (LAN) communication module or a power line communication (PLC) module). A corresponding one of these communication modules may communicate with the external electronic device via the first network 698 (e.g., a short-range communication network, such as Bluetooth™, Wi-Fi direct, or a standard of the Infrared Data Association (IrDA)) or the second network 699 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 692 may identify and authenticate the electronic device 601 in a communication network, such as the first network 698 or the second network 699, using subscriber information (e.g., international mobile subscriber identity (IMSI)) stored in the subscriber identification module 696.

The antenna module 697 may transmit or receive a signal or power to or from the outside (e.g., the external electronic device) of the electronic device 601. The antenna module 697 may include one or more antennas, and, therefrom, at least one antenna appropriate for a communication scheme used in the communication network, such as the first network 698 or the second network 699, may be selected, for example, by the communication module 690 (e.g., the wireless communication module 692). The signal or the power may then be transmitted or received between the communication module 690 and the external electronic device via the selected at least one antenna.

Commands or data may be transmitted or received between the electronic device 601 and the external electronic device 604 via the server 608 coupled with the second network 699. Each of the electronic devices 602 and 604 may be a device of a same type as, or a different type, from the electronic device 601. All or some of operations to be executed at the electronic device 601 may be executed at one or more of the external electronic devices 602, 604, or 608. For example, if the electronic device 601 should perform a function or a service automatically, or in response to a request from a user or another device, the electronic device 601, instead of, or in addition to, executing the function or the service, may request the one or more external electronic devices to perform at least part of the function or the service. The one or more external electronic devices receiving the request may perform the at least part of the function or the service requested, or an additional function or an additional service related to the request and transfer an outcome of the performing to the electronic device 601. The electronic device 601 may provide the outcome, with or without further processing of the outcome, as at least part of a reply to the request. To that end, a cloud computing, distributed computing, or client-server computing technology may be used, for example.

Figure 7:
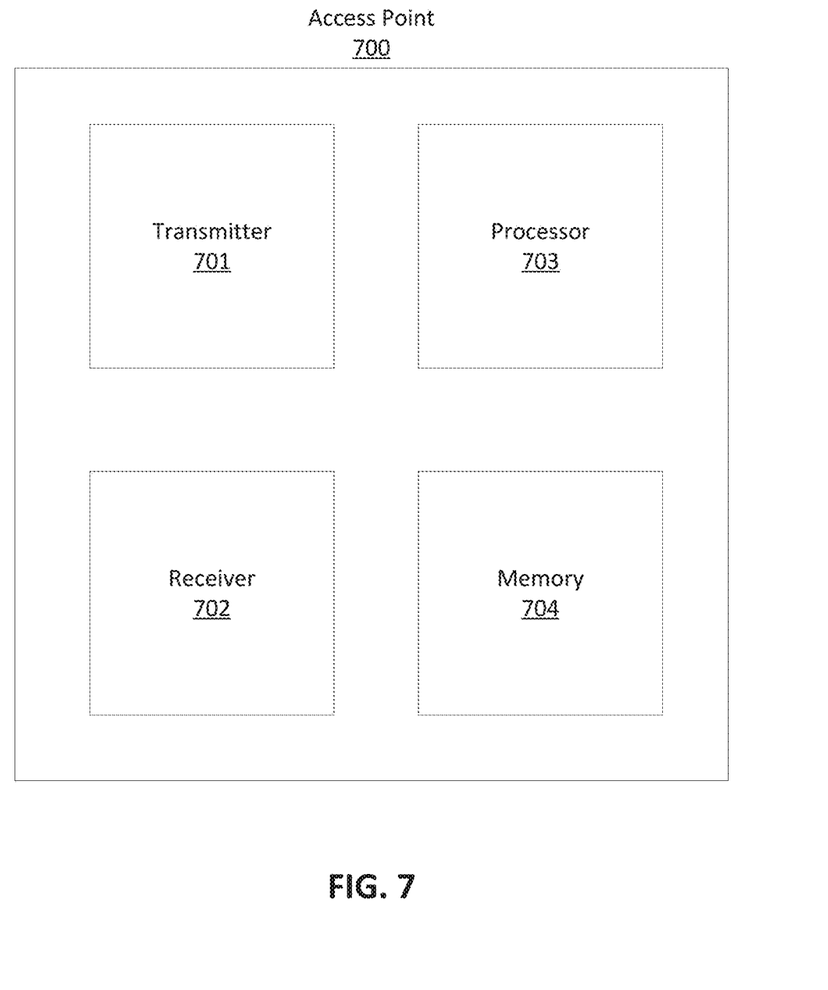
FIG. 7 is a block diagram of an AP in a network environment, according to an embodiment.

FIG. 7 is a block diagram of an AP in a network environment, according to an embodiment.

Referring to FIG. 7, the components and structure comprising the AP 700 may correspond to an anchor-AP, coordinator-AP, and/or STA, as described herein. The AP 700 includes a transmitter 701 for transmitting wireless signals, a receiver 702 for receiving wireless signals. The transmitter 701 and receiver 702 may be included in an antenna system for radiating and receiving wireless signals. The AP 700 may be connected to a network via a wired or wireless connection.

The AP 700 also includes a processor 703 for controlling the AP's operations. For example, the processor 703 of the AP 700 may execute instructions stored in the memory 704 for receiving and transmitting wireless signals, managing the AP's resources, and/or enforcing security protocols. The memory 704 may be any memory capable of storing instructions that may be executed by the processor 703, such as a volatile memory or a non-volatile memory.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of data-processing apparatus. Additionally or alternatively, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims.

What is claimed is:

1. A method performed by a coordinating network entity in a virtual network including a plurality of access points (APs) and at least one wireless station (STA), the method comprising:
receiving one or more parameters from at least one AP included in the plurality of APs;
identifying a first multi-AP coordination scheme based on the one or more parameters; and
assigning the first multi-AP coordination scheme to a first dynamic group of network entities included in the virtual network,
wherein the first dynamic group of network entities performs wireless communication based on the first multi-AP coordination scheme.

2. The method of claim 1, further comprising:
assigning a second multi-AP coordination scheme to a second dynamic group of network entities included in the virtual network,
wherein the second dynamic group of network entities performs wireless communication based on the second multi-AP coordination scheme.

3. The method of claim 2, wherein the first dynamic group of network entities does not include any of the same network entities included in the second dynamic group of network entities.

4. The method of claim 2, wherein at least one network entity included in the first dynamic group of network entities is also included in the second dynamic group of network entities.

5. The method of claim 1, wherein the at least one or more parameters comprise a link quality metric (LQM) table indicating at least one path loss value between two network entities included in the virtual network.

6. The method of claim 1, wherein the at least one or more parameters comprises an uplink or downlink queue size of the at least one STA.

7. The method of claim 1, wherein the first dynamic group of network entities are determined based on a network map of relative spatial configurations of one or more of the network entities included in the virtual network.

8. The method of claim 1, further comprising:
assigning a second multi-AP coordination scheme to the first dynamic group of network entities included in the virtual network in case that a value of the one or more parameters changes more than a predetermined threshold.

9. The method of claim 1, wherein the coordinating network entity is included in at least one of the plurality of APs.

10. The method of claim 1, further comprising:
periodically receiving an updated version of one or more of the parameters from the at least one AP included in the plurality of APs.

11. A virtual network comprising:
a plurality of access points (APs);
at least one wireless station (STA); and
a coordinating network entity configured to:
receive one or more parameters from at least one AP included in the plurality of APs;
identify a first multi-AP coordination scheme based on the one or more parameters; and
assign the first multi-AP coordination scheme to a first dynamic group of network entities included in the virtual network,
wherein the first dynamic group of network entities performs wireless communication based on the first multi-AP coordination scheme.

12. The virtual network of claim 11, wherein the coordinating network entity is further configured to:
assign a second multi-AP coordination scheme to a second dynamic group of network entities included in the virtual network,
wherein the second dynamic group of network entities performs wireless communication based on the second multi-AP coordination scheme.

13. The virtual network of claim 12, wherein the first dynamic group of network entities does not include any of the same network entities included in the second dynamic group of network entities.

14. The virtual network of claim 12, wherein at least one network entity included in the first dynamic group of network entities is also included in the second dynamic group of network entities.

15. The virtual network of claim 11, wherein the at least one or more parameters comprise a link quality metric (LQM) table indicating at least one path loss value between two network entities included in the virtual network.

16. The virtual network of claim 11, wherein the at least one or more parameters comprises an uplink or downlink queue size of the at least one STA.

17. The virtual network of claim 11, wherein the first dynamic group of network entities are determined based on a network map of relative spatial configurations of one or more of the network entities included in the virtual network.

18. The virtual network of claim 11, wherein the coordinating network entity is further configured to:
assign a second multi-AP coordination scheme to the first dynamic group of network entities included in the virtual network in case that a value of the one or more parameters changes more than a predetermined threshold.

19. The virtual network of claim 11, wherein the coordinating network entity is included at least one of the plurality of APs.

20. The virtual network of claim 11, wherein the coordinating network entity is further configured to:
periodically receive an updated version of one or more of the parameters from the at least one AP included in the plurality of APs.

* * * * *